Nov. 18, 1958  S. BERNSTEIN  2,861,189
PRECISION LIMITER CIRCUIT FOR A RADIATION-TYPE GAUGE
Filed April 29, 1954
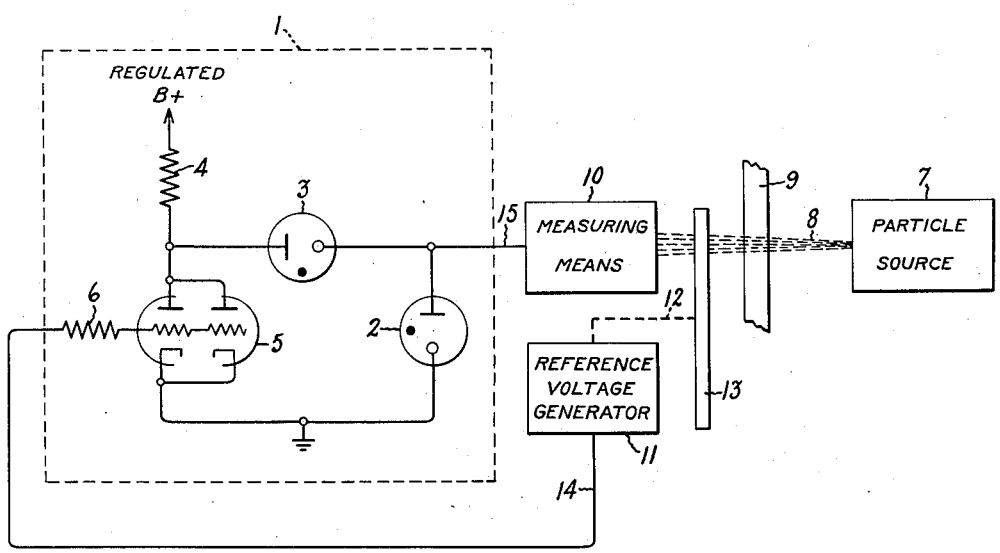
Inventor:
Stanley Bernstein,
by Charles W Helzer
His Attorney.

United States Patent Office 2,861,189
Patented Nov. 18, 1958

2,861,189

PRECISION LIMITER CIRCUIT FOR A RADIATION-TYPE GAUGE

Stanley Bernstein, Schenectady, N. Y., assignor to General Electric Company, a corporation of New York Application April 29, 1954, Serial No. 426,432

14 Claims. (Cl. 250—83.3)

This invention relates to a precision limiter circuit for providing a constant amplitude alternating voltage, and more particularly to such a circuit especially adapted for use in a radiation-type gauge employing subatomic particles as a measuring agent.

Various non-contacting gauges using subatomic particles such as beta rays have been devised to measure the absorption, and therefore the thickness, of materials without having the gauge in contact with said materials. One such thickness gauge is shown in Patent No. 2,488,269, issued on November 15, 1949, to C. W. Clapp, and assigned to the General Electric Company, the assignee of the present invention. The basic elements of such a thickness gauge are a constant source of subatomic particles spaced a fixed distance from a suitable detector, and means to indicate the total number and/or energy of the particles reaching the detector. When the material, the thickness of which is to be measured, is interposed between the source and the detector, a reduction in the number and/or energy of particles reaching the detector is noted. The particles reaching the detector are caused to produce an alternating voltage therein having an amplitude proportional to their number and/or energy; and any variation in amplitude of this voltage is used to measure the thickness of the material.

After the alternating voltage that indicates the thickness of the material is obtained, it must be accurately measured. This can best be done by a null-balance system, as described in the aforementioned patent. Such a system involves a circuit to which is applied a first alternating voltage that indicates the thickness of the material. A second alternating voltage, displaced 180° from the first alternating voltage, is then applied to said circuit, and the resultant of these two voltages serves as a measure of the deviation of the material from a preset thickness.

It is extremely important that said second alternating voltage be very stable for a period of hours or days, since any instability therein will cause an error in the thickness measurements. Specifically, it is desirable to produce an alternating voltage having a stability of the order of 0.1% for a period of days. Present methods of obtaining this stability include motor-generator sets with ballast tube regulators, temperature limited diodes in bridge circuits, and clippers with stable direct current reference voltages. The present invention comprises a circuit in the last-named class which obtains a stable alternating voltage of square-wave form utilizing a minimum of components.

It is therefore an object of this invention to provide a precision limiter circuit with a minimum of components for obtaining an extremely stable alternating voltage.

Another object of the invention is to provide a thickness gauge utilizing such a precision limiter circuit to enable extremely accurate thickness measurements to be made.

Other objects and advantages of the invention will become apparent as the description proceeds.

In accordance with the invention, a precision limiter circuit is disclosed for obtaining an extremely constant and stable alternating voltage of the square-wave form. This is achieved by providing an impedance such as a gas tube, a first switch such as a gas tube connecting the impedance to a source of regulated direct current potential, and a second switch such as a triode connected in shunt across both the first switch and the impedance. The second switch receives electrical waveforms which periodically pulse it, and every time the second switch is pulsed, the first switch applies the regulated direct current potential to the impedance. As a result of this action, the output voltage across the impedance will have square-wave form with a peak-to-peak value precisely equal to the voltage drop thereacross, and this value will remain constant for long periods of time.

The features of this invention which are believed to be novel and patentable are pointed out in the claims which form a part of this specification. For better understanding of the invention, reference is made in the following description to the accompanying drawing in which the sole figure shows a circuit diagram of the precision limiter circuit and also the connections of this circuit within a block diagram of a thickness gauge.

Referring now to the sole figure, there is shown thereon a block 1 containing the precision limiter circuit of the invention. This block contains a load impedance 2, which may be a gas-filled diode such as the CK5651WA, the cathode of this diode being connected to ground. A switch 3 is also provided, which may also be a gas-filled diode of the CK5651WA type, and has its cathode connected to the anode of impedance tube 2. The anode of switch tube 3 is connected to one end of a resistor 4, the other end of said resistor being connected to a source of regulated positive potential which may have a value of 250 volts and is labelled B+. The regulation of this source of potential should be approximately 1%, and resistor 4 may have a value of 20,000 ohms. Connected in shunt across both switch tube 3 and impedance tube 2 is a second switch tube 5 which may be a dual triode of the 6SN7 type, with the anodes, grids, and cathodes respectively connected together to form a single triode; or a single triode may be used. The cathodes of switch tube 5 are connected to ground and the anodes of this tube are connected to the junction of resistor 4 and the anode of switch tube 3. Connected to the grids of switch tube 5 is a resistor 6, which may have a value of 0.5 megohm. The regulated positive potential, the tube types, and the values of the resistors, are so chosen that switch tube 5 is normally conductive, and during this conductive state its anode potential drops to such a value that switch tube 3 is nonconductive and no potential appears at the anode of impedance tube 2. However, every time switch tube 5 is driven to cutoff its plate potential rises sufficiently to enable switch tube 3 to conduct and apply a positive potential from the regulated power supply across impedance tube 2.

In the operation of the precision limiter circuit of block 1, an alternating current voltage is applied to the control grids of switch tube 5 through resistor 6. In operation, it has been found that an alternating voltage having a value of 50 volts R. M. S. is suitable for use with this circuit. As this voltage becomes negative relative to ground, switch tube 5 is driven to cut-off and the anodes of this tube rise in potential. This potential rise causes switch tube 3 to conduct and applies the regulated positive potential to the anode of impedance tube 2, causing this tube to conduct. The potential drop across this tube is positive and approximately 80 volts. As the input waveform rises above the cut-off potential of switch tube 5, this tube will conduct and its anode potential will drop, causing switch tube 3 to be cut off and removing any potential from the anode of impedance tube 2 and causing tube 2 to become nonconductive again. In view of the extremely rapid conduction and non-conduction characteristics of gas tubes 2 and 3, it will be apparent that the potential drop across impedance tube 2 will have the form of a square wave with a peak-to-peak value of 80 volts. Resistor 6 serves as a clipping resistor to prevent excessive grid current from flowing, and resistor 4 is wire wound for maximum stability.

By using switch tube 3 and extremely stable impedance tube 2 in the circuit, the effects of the aging of tubes 3 and 5 and changes in the regulated B+ are greatly reduced since they cannot directly affect the output voltage of the circuit, which is the voltage drop across impedance tube 2. A tube of the CK5651WA type is desirable for use as impedance tube 2, since these tubes have less than 1% drift during 5,000 hours of use. Another suitable tube, replacing the CK5651WA, would be the 85A2, also an extremely stable gas-filled diode.

It should be understood that although switch tube 5 is normally conductive and maintains switch tube 3 normally nonconductive, the pulsing of tube 5 causing it to become nonconductive and permitting tube 3 to become conductive, the invention is not limited to this type of circuit. For example, an equally accurate circuit could be produced by biasing tube 5 so that it is normally nonconductive, whereupon tube 3 will be normally conductive and become nonconductive only when tube 5 becomes conductive. While the former circuit is the preferred embodiment, the latter circuit also possesses the major advantages enumerated above, and some of the appended claims are not limited to any specific conductive tube states.

Moreover, although tubes 2 and 3 have been shown as extremely stable gas-filled diodes, tube 3 need not be as stable as tube 2 since its function is merely that of a switch. However, if impedance tube 2 is replaced by a stable impedance such as a wire wound resistor, switch tube 3 and the source of regulated B+ must be as stable as the use required of the limiter circuit.

The precision limiter circuit of the invention was specifically developed for use with the thickness gauge shown in the remainder of the figure. A brief description of this thickness gauge follows; however, a more detailed description may be found in the aforementioned patent. As shown in the figure, a particle source 7 emits a beam 8 of subatomic particles, which may be alpha, beta or gamma particles, for example, the choice depending upon the thickness of the material being measured and the source available. This beam of particles passes through material 9, the thickness of which is being measured, and enters a measuring means 10. Measuring means 10 produces a voltage proportional in amplitude to the number and/or energy of the subatomic particles passing through material 9.

A reference voltage generator 11 is also provided, and it may be an ordinary motor driven generator having a shaft 12 coupled thereto for driving an interrupter 13 which is disposed between material 9 and measuring means 10. Interrupter 13 serves to periodically interrupt the particle beam 8 from particle source 7 and thereby produce a first alternating voltage within measuring means 10 having an amplitude proportional to the number and/or energy of the subatomic particles passing through the object. A second alternating voltage that is 180° out of phase with said first alternating voltage is generated by reference voltage generator 11 and appears on a lead 14. This last-named alternating voltage is the input to the control grids of switch tube 5, and serves to produce upon a lead 15 coming from the anode of impedance tube 2 the extremely stable square-wave alternating voltage previously noted. This square-wave alternating voltage is 180° out of phase with the first alternating voltage produced by the measuring means. Measuring means 10 also contains a null-balance circuit for accurately measuring any difference between two voltages applied thereto. One of the two voltages applied to this circuit is the square-wave alternating voltage, and the other is said first alternating voltage, and the resultant alternating voltage output from the null-balance circuit serves as an accurate measure of the thickness of material 9.

It is desired to emphasize the fact that while the precision limiter circuit of the invention is particularly well adapted for use with the thickness gauge shown in this figure, it is also useful in other types of apparatus and wherever extremely stable alternating voltages are desired. For example, such a circuit could be used in a width gauge where it is desired to measure the duty cycle of a piece of equipment, duty cycle being defined as the ratio of the equipment's "on" time to its "off" time. For a further explanation of said gauges, reference is made to an article in the March 1953 issue of Electronics, pages 114 to 118, by E. S. Sampson of the General Electric Company, and entitled "Photoelectric Width Gauge for Hot-Strip Steel Mills."

In measuring such duty cycles, it is necessary to have extremely stable square waves, since any variation in square wave height will result in a reading which varies with square wave amplitude rather than with square wave duration. The precision limiter circuit of the invention obviously has great utility in such gauges.

From the foregoing, it is believed apparent that an extremely accurate limiter circuit and thickness gauge have been disclosed utilizing a minimum of components and yet attaining a voltage stability which is great. Moreover, the voltage output of the circuit of this invention is almost completely independent of any changes in tube characteristics of the switch tubes therein; a feature which makes it unique among electrical tube limiter circuits.

What I claim as new and desire to secure by Letters Patent of the United States is:

1. A precision limiter circuit comprising impedance means, first switch means interconnecting said impedance means and a source of regulated direct current potential, and second switch means connected in shunt across both said first switch means and said impedance means and receptive of electrical waveforms for periodic operation thereof, said first switch means being operated by the operation of said second switch means and thereby periodically applying said potential to said impedance means.

2. A precision limiter circuit according to claim 1, wherein said impedance means comprises an extremely stable electrical tube.

3. A precision limiter circuit according to claim 1, wherein said first switch means comprises an electrical tube which can conduct only when said second switch means is pulsed.

4. A precision limiter circuit comprising impedance means, first electrical tube means interconnecting said impedance means and a source of regulated direct current potential, and second electrical tube means connected in shunt across both said first electrical tube means and said impedance means and receptive of electrical waveforms for periodic pulsing thereof, said first tube means becoming conductive only when said second tube means is pulsed and becomes non-conductive, the conduction of said first tube means serving to apply said potential to said impedance means.

5. A precision limiter circuit according to claim 4, wherein said impedance means comprises an extremely stable gas-filled tube.

6. A precision limiter circuit according to claim 5, wherein said first tube means comprises a gas-filled tube.

7. A precision limiter circuit comprising first and second gas-filled diode means, said first gas-filled diode means being extremely stable and having its anode connected to the cathode of said second gas-filled diode means, and vacuum tube triode means having a control grid receptive of electrical waveforms for periodic pulsing thereof, the anode of said triode means being connected to the anode of said second gas-filled diode means and also being connected through an anode resistor to a source of regulated direct current potential, the cathode of said triode means being coupled to the cathode of said first gas-filled diode means, said second gas-filled diode means becoming conductive only when said triode means is pulsed and becomes non-conductive, the conduction of said second gas-filled diode means serving to apply said potential to the anode of said first gas-filled diode means to enable it to conduct and produce an output voltage thereacross.

8. A radiation-type gauge comprising measuring means for producing a first alternating voltage related to the number of subatomic particles passing through an object and also for measuring any inequality between two voltages applied thereto, means for producing a second alternating voltage 180° out-of-phase with said first alternating voltage, impedance means connected to said measuring means, first switch means interconnecting said impedance means and a source of regulated, direct current potential, and second switch means connected in shunt across both said first switch means and said impedance means and being receptive of and periodically pulsed by said second alternating voltage, said first switch means being operated by the operation of said second switch means and thereby periodically applying said direct current potential to said impedance means to produce a third alternating voltage across said impedance means that is 180° out-of-phase with said first alternating voltage, said measuring means measuring any difference between said first and third alternating voltages.

9. A radiation-type gauge according to claim 8 wherein said impedance means comprises an extremely stable electrical tube.

10. A radiation-type gauge according to claim 8, wherein said first switch means comprises an electrical tube which becomes conductive only when said second switch means is pulsed.

11. A radiation-type gauge comprising measuring means for producing a first alternating voltage related to the number of subatomic particles passing through an object and also for measuring any inequality between two voltages applied thereto, means for producing a second alternating voltage 180° out-of-phase with said first alternating voltage, impedance means connected to said measuring means, first electrical tube means interconnecting said impedance means and a source of regulated direct current potential, and second electrical tube means connected in shunt across both said first electrical tube means and said impedance means and being receptive of and periodically pulsed by said second alternating voltage, said first tube means becoming conductive only when said second tube means is pulsed and becomes non-conductive, the conduction of said first tube means serving to apply said direct current potential to said impedance means to produce a third alternating voltage across said impedance means that is 180° out-of-phase with said first alternating voltage, said measuring means measuring any difference between said first and third alternating voltages.

12. A radiation-type gauge according to claim 11, wherein said impedance means comprises an extremely stable gas-filled tube.

13. A radiation-type gauge according to claim 12, wherein said first tube means comprises a gas-filled tube.

14. A radiation-type gauge comprising measuring means for producing a first alternating voltage related to the number of subatomic particles passing through an object and also for measuring any inequality between two voltages applied thereto, means for producing a second alternating voltage 180° out-of-phase with said first alternating voltage, extremely stable first gas-filled diode means connected to said measuring means, second gas-filled diode means, the anode of said first gas-filled diode means being connected to the cathode of said second gas-filled diode means, and vacuum tube triode means having a control grid receptive of and periodically pulsed by said second alternating voltage, the anode of said triode means being connected to the anode of said second gas-filled diode means and also being connected through an anode resistor to a source of regulated direct current potential, the cathode of said triode means being coupled to the cathode of said first gas-filled diode means, said second gas-filled diode means becoming conductive only when said triode means is pulsed and becomes non-conductive, the conduction of said second gas-filled diode means serving to apply said direct current potential to the anode of said first gas-filled diode means to enable it to conduct and produce a third alternating voltage thereacross that is 180° out-of-phase with said first alternating voltage, said measuring means measuring any difference between said first and third alternating voltages.

References Cited in the file of this patent

UNITED STATES PATENTS

| | | |
|---|---|---|
| 2,549,654 | Wittenberg | Apr. 17, 1951 |
| 2,584,714 | Kirkpatrick | Feb. 5, 1952 |
| 2,665,386 | Krasnow et al. | Jan. 5, 1954 |
| 2,702,352 | Krasnow et al. | Feb. 15, 1955 |